United States Patent
Takano

[11] Patent Number: 6,153,957
[45] Date of Patent: Nov. 28, 2000

[54] DC BRUSHLESS MACHINE

[75] Inventor: Tadashi Takano, Mori-machi, Japan

[73] Assignee: Moriyama Kogyo Kabushiki Kaisha, Mori-machi, Japan

[21] Appl. No.: 09/442,892

[22] Filed: Nov. 18, 1999

[30] Foreign Application Priority Data

Nov. 19, 1998 [JP] Japan .................................. 10-329878

[51] Int. Cl.$^7$ ................................................. H02K 11/00
[52] U.S. Cl. ........................................ 310/71; 310/DIG. 6
[58] Field of Search ................................ 310/71, DIG. 6, 310/67 R, 49 A, 68 R; 318/138; 417/366

[56] References Cited

U.S. PATENT DOCUMENTS

| | | | |
|---|---|---|---|
| 3,984,712 | 10/1976 | Hill | 310/71 |
| 4,311,933 | 1/1982 | Riggs et al. | 310/156 |
| 4,528,485 | 7/1985 | Boyd, Jr. | 318/138 |
| 4,724,346 | 2/1988 | Klein et al. | 310/67 R |
| 4,773,829 | 9/1988 | Vettori | 417/366 |

OTHER PUBLICATIONS

Patent Abstracts of Japan, vol. 009, No. 263 (E–351), Oct. 19, 1985 & JP 60 109739 A (Shibaura Seisakush: KK), Jun. 15, 1985.

European Search Report dated Mar. 16, 2000.

Primary Examiner—Nestor Ramirez
Assistant Examiner—Guillermo Perez
Attorney, Agent, or Firm—Ernest A. Beutler

[57] ABSTRACT

A rotating electrical machine having a simplified terminal construction for providing the electrical connections to the individual armature windings. This connection is provided by a terminal plate comprised of an insulating base having conductive terminals affixed to its opposite sides. This insulating plate and the terminals have slots that receive the ends of the armature windings for facilitating and simplifying the electrical connections. In addition, the terminal plate and the sensor elements for the machine are disposed in substantial axial alignment with each other but radially spaced from each other to provide a compact assembly.

11 Claims, 6 Drawing Sheets

DC BRUSHLESS MACHINE

BACKGROUND OF THE INVENTION

This invention relates to a rotary electrical machine, such as a brushless DC motor, flywheel magneto or generator and more particularly to an improved arrangement for communicating electrical power with the windings of the armature coils of the stator of such machines.

As is well known, many types of rotary electrical machines employ a stator that has a number of circumferentially-spaced coils that are disposed outwardly of and around the rotational axis of the machine rotor. These coils are generally wound around poles that are formed in some suitable manner and which are affixed to the outer housing of the machine. The windings for each armature have terminal ends that obviously must be connected to the terminals of the machine to either receive or transmit electrical power. Generally, the terminal ends at the opposite ends of each winding are connected by soldering to the external conductors. These connections may be either all at one side of the armature or at opposite sides of the armature.

Because of the advent of high quality, permanent magnets utilizing rare earth materials, it is possible to provide electric motors that are quite small in size and which can be powered by portable power supplies, such as batteries. These types of devices offer the utilization of electric motors for powering a number of devices that have been normally driven in other manners.

For example, in vehicles powered by internal combustion engines, many accessories are powered by direct drive from the engine. This provides problems in connection with complex pulley drives, etc.

The use of these high efficiency electrical motors can be enjoyed in such an application to limit the number of accessories that are directly driven by the engine. However, when this type of device is utilized, the voltages available for power are relatively low, thus necessitating high current flows to provide the requisite electrical power output. The same situation arises if the machine functions as a generator as opposed to functioning as a motor.

In order to permit these high current flows, the windings of the armature coils must use wires having fairly large diameters or stranded wires that together provide a large effective diameter. This tends to increase the size of the electric machine, particularly in the axial direction and presents significant problems in connections with the electrical connection between the external power connection and the terminal ends of these armature coils. Also, because the wire diameter is large, the wire is difficult to manipulate at the terminal ends and difficult to connect to the external conductors.

It is, therefore, a principal object of this invention to provide an improved electrical connection for the armatures of a rotating electric machine.

It is a further object of this invention to provide an improved and simplified electrical connection arrangement between the individual windings of the armature of a rotating electric device and an external power supply or output.

SUMMARY OF THE INVENTION

This invention is adapted to be embodied in a rotating electrical machine that has an outer housing in which a stator is mounted. The stator is provided with a plurality of armatures consisting of poles and surrounding armature windings. Adjacent at least one side of this armature assembly is a terminal plate to which main power connection cables are electrically connected. The terminal ends of the armature windings are electrically connected to this terminal plate.

DETAILED DESCRIPTION OF THE PREFERRED EMBODIMENT OF THE INVENTION

Figure 1:
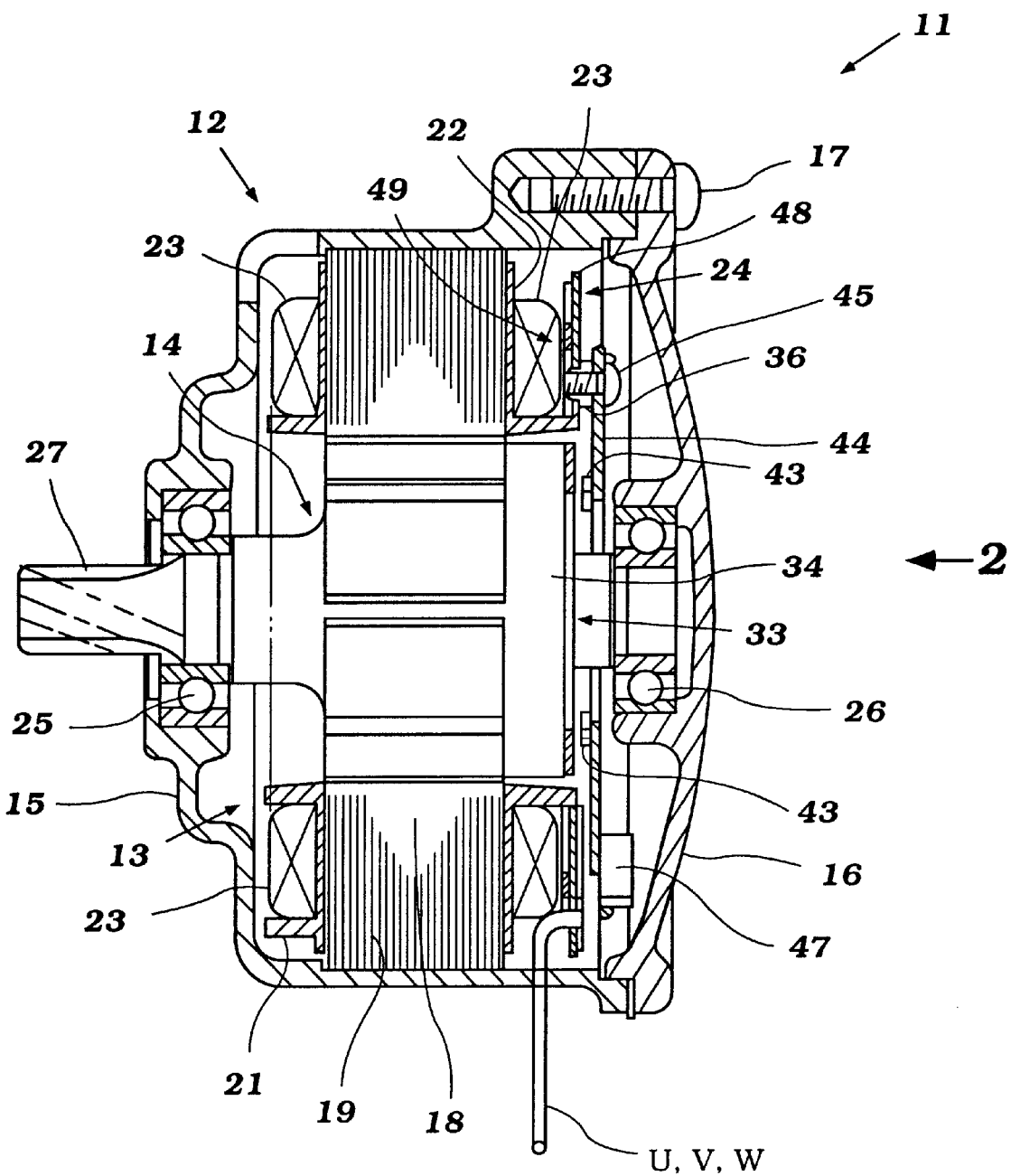
FIG. 1 is a cross-sectional view taken through a rotating electrical machine such as a DC brushless motor that is constructed and operated in accordance with an embodiment of the invention.
Figure 2:
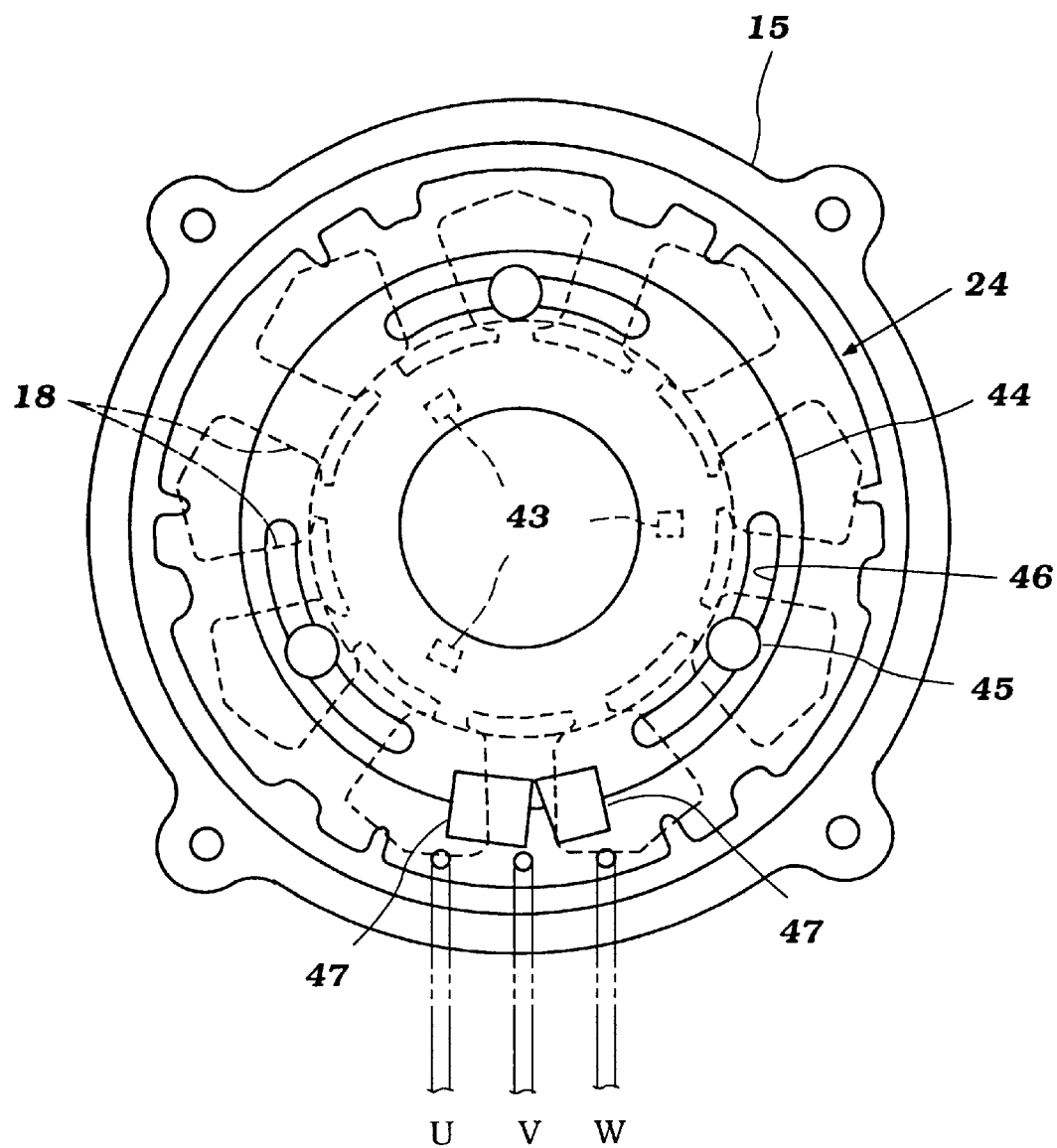
FIG. 2 is a view of the machine looking in the direction of the arrow 2 in FIG. 1 with the cover plate removed.

Referring now in detail to the drawings and initially primarily to FIG. 1, a brushless DC motor is shown in cross-section and identified generally by the reference numeral 11. The motor 11 functions as a three phase, alternating current, synchronous motor. The invention is described in conjunction with a brushless DC motor, but it is to be understood that it may be utilized with other electrical machines including electrical generating devices, such as flywheel magnetos or generators. Therefore, the device is referred to generally as a rotary electrical machine and in a preferred embodiment, comprises a motor.

The machine 11 includes an outer housing assembly, indicated generally by the reference numeral 12, in which a stator or armature assembly, indicated generally by the reference numeral 13, is positioned. A rotor, indicated generally by the reference numeral 14, is supported in the housing assembly 12 in a manner which will be described.

The housing assembly 12 is comprised of a main housing piece 15 that has a generally cup shape and which is formed from a suitable material which may be of any known type. This housing piece defines an internal cavity wherein the armature 13 and main portion of the rotor 14 are positioned. This cavity is closed by a cover plate 16 that is affixed to the main housing piece 15 in a suitable manner, as by threaded fasteners 17.

The stator or armature assembly 13 is comprised of a plurality of poles or cores, indicated generally by the reference numeral 18, which extend radially inwardly from the housing piece 15 toward the rotor 14. These cores or poles 18 are made up of laminated soft iron plates 19 which may be formed as stampings or the like and which are stacked in relationship to each other.

These cores 18 are engaged on opposite sides by insulating plates 21 and 22 which are formed from a suitable non-conductive material, such as a plastic or the like. Between the cores 18, these plastic insulating plates 21 and 22 have inwardly extending fingers that correspond to the spacing around the cores.

Figure 8:
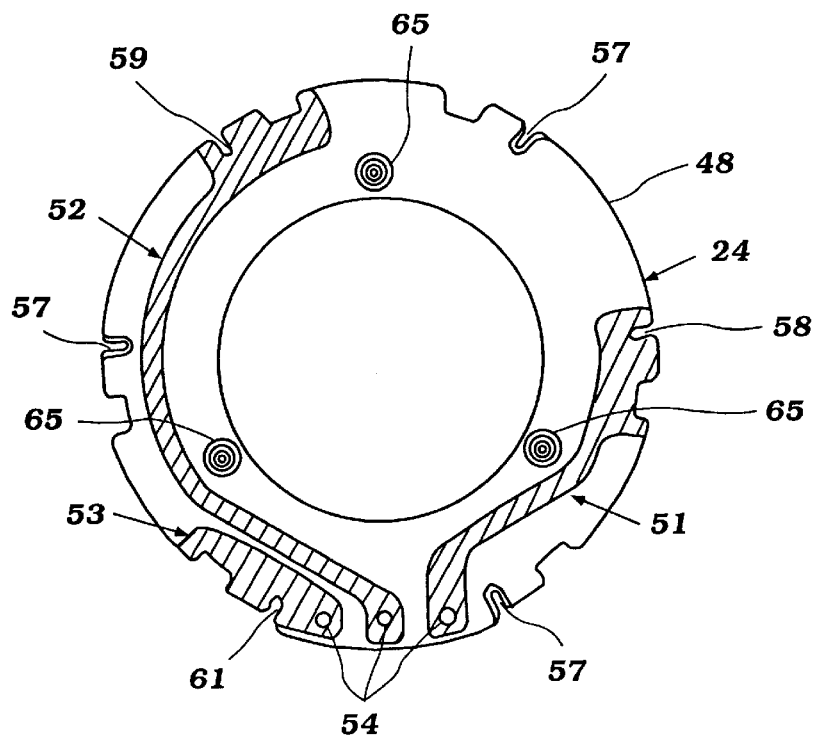
FIG. 8 is an enlarged view looking at one side of the terminal plate for the armature.
Figure 9:
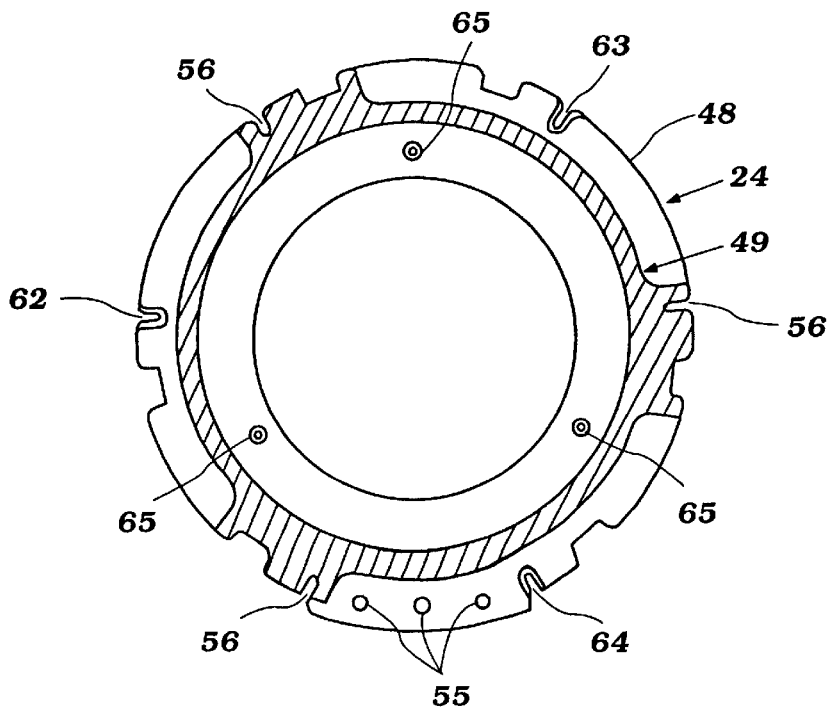
FIG. 9 is an enlarged view of the terminal plate looking in the direction opposite to FIG. 8.

An electrical coil or armature winding 23 encircles each core 18 and extends axially beyond the cores as seen in FIG. 1 relative to the axis of rotation of the rotor 14. Preferably, these windings are formed from a highly conductive material, such as copper or the like, which is insulated by a suitable coating, such as an enamel coating, formed on its outer surface. The terminal ends of each winding 23 are connected, in a manner to be described, to a terminal plate, indicated generally by the reference numeral 24 and which has a construction that will be described shortly by reference primarily to FIGS. 8–10.

This permits attachment to three external power cables, indicated by the reference characters U, V, and W for connection to a suitable electrical source when the machine 11 functions as a motor. These cables can receive generated power if the machine 11 is functioning as a generator.

In the illustrated embodiment, this electrical source may comprise a three-phase electrical system, although obviously other types of power supplies can be employed. For this purpose, the armature windings 23 are arranged in three groups indicated at 23-1, 23-2 and 23-3 in FIG. 10.

Figure 3:
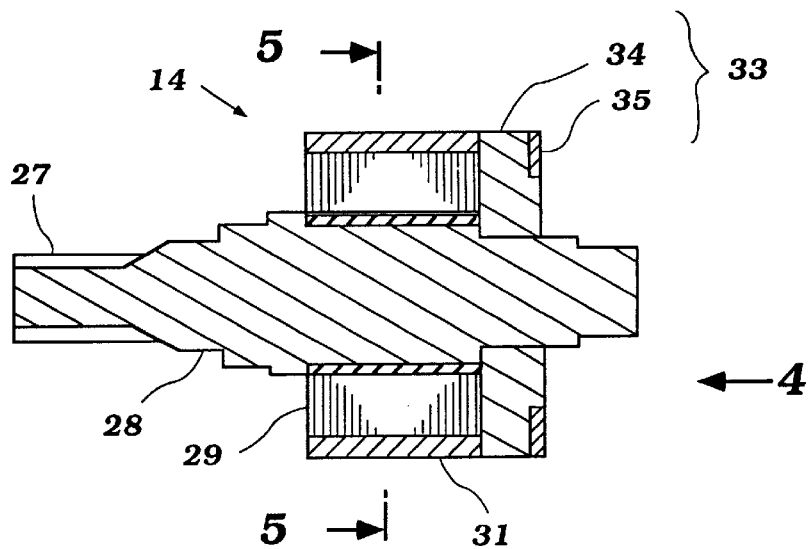
FIG. 3 is an enlarged cross-sectional view of the rotor of the machine taken in the same direction as FIG. 1.

The rotor 14 is journaled within the housing assembly 12 by a first bearing 25 that is carried by the main housing member 15 and a second bearing 26 that is carried by the cover plate 16. The rotor 14 has an extending end portion on which a drive gear 27 may be provided for driving a load of any desired type. This geared end portion 27 protrudes outwardly beyond the main cover member 15. If the machine 11 functions as a generator, the rotor 14 will be driven in any appropriate manner The construction of the rotor 14 will be described now primarily to FIGS. 3–7 and initially to FIGS. 3 and 6. The rotor 14 is comprised of an inner shaft portion 28 upon which the drive gear 27 may be integrally formed. A yoke 29 is mounted on this shaft 28 by means which may include an elastic sleeve.

The yoke 29 may conveniently be formed as a soft iron laminate made out of stamped sheets. For example, these may be formed from the scrap center portions from which the armature plates 19 are stamped.

Figure 5:
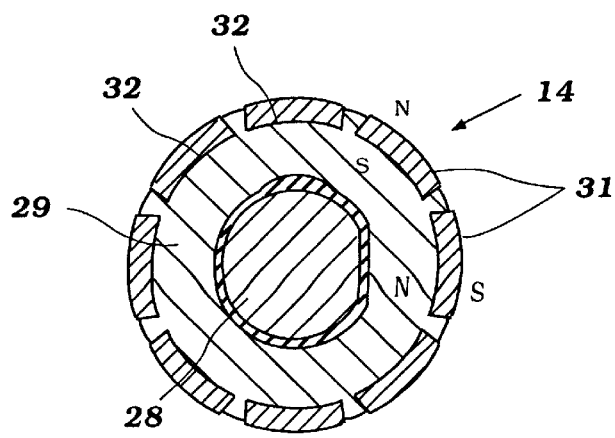
FIG. 5 is a cross-sectional view of the rotor taken along the line 5—5 of FIG. 3.

Bonded to the exterior portion of this yoke 29 are a plurality of generally arcuately-shaped permanent magnets 31. These permanent magnets 31 are received in slots 32 formed in the periphery of the yoke and are magnetized so that their north and south poles (n, s) are disposed in radially spaced directions in alternating patterns as seen in FIG. 5. Preferably, these magnets 31 are formed from a high efficiency material such as neodymium. These may be bonded to the yoke 29 before being magnetized and then magnetized in the radial direction after adhered thereto.

For use in detecting the position of the magnetic poles on the rotor 14, there is provided a magnetic detector ring, indicated generally by the reference numeral 33, and which has a construction as best seen in FIGS. 3–7. This ring 33 is comprised in major part of an insulating member 34 and an annular, ring type magnet carrier 35.

The insulating member 34 is formed as an annular member constructed from a suitable plastic material. The magnet carrier 35 has a material which will be described shortly and is adhered to this insulating ring 34 in a manner which will be described. The detector ring 33 has a diameter that is slightly smaller than the overall diameter of the remainder of the rotor 14 as may be best seen in FIG. 1 so as to provide a clearance around the inner periphery of the armature 13.

Figure 4:
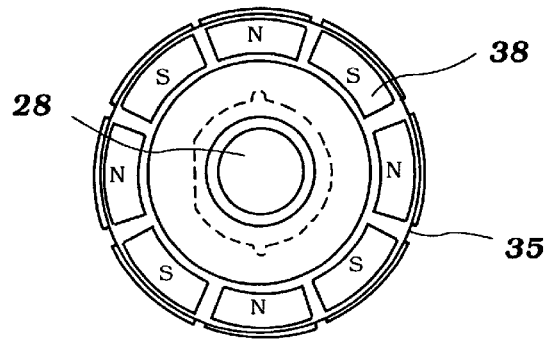
FIG. 4 is an end elevational view of the rotor looking in the same general direction as FIG. 2 and in the direction of the arrow 4 in FIG. 3.
Figure 6:
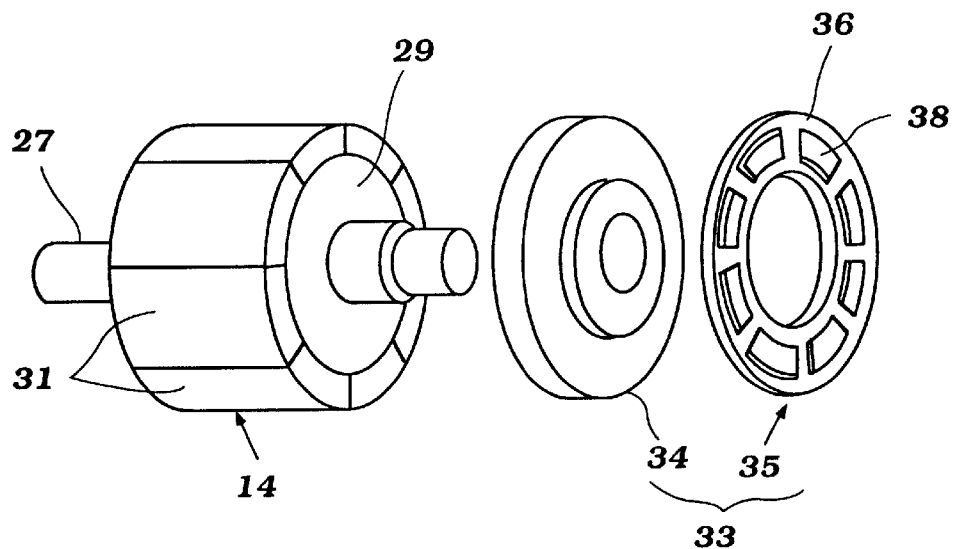
FIG. 6 is an exploded perspective view of the rotor.
Figure 7:
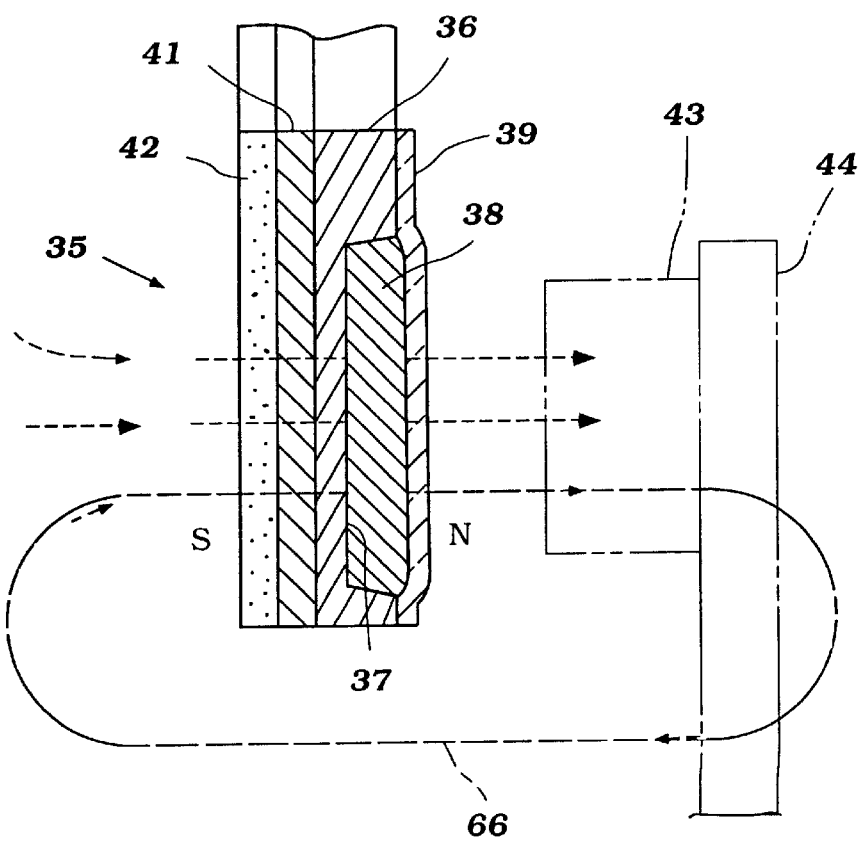
FIG. 7 is an enlarged cross-sectional view taken through a portion of the sensor plate of the rotor and shows its relationship to the detector ring, in phantom.

As may be best seen in FIGS. 4, 6 and 7, the magnet carrier 35 is formed from a base piece or a substrate 36 which is formed from a polyester resin or the like and which is formed with recesses 37 in its face which receive nine sheet like magnets 38. These magnets 38 may be made by solidifying a paste acrylic resin mixed with powdered or particulate magnetic material. This is frequently referred to as a "paste magnet". The magnetic material is preferably a rare earth such as Nd—Fe—B (neodymium-Fe-Boron).

These magnets 38 are magnetized in the axial direction or in the direction of their thickness as shown by the polarity indicated in FIG. 7. As seen in FIG. 4, the magnets 38 are positioned in the magnet carrier recesses 37 so that their polarity alternates in a circumferential direction around the magnet carrier 35.

A protective film 39 formed from a transparent acrylic resin extends across the face of the carrier ring 36 and assists in maintaining the magnets 38 in position and protecting them.

The carrier ring 36 may be supplied by a supplier and has an acrylic adhesive layer 41 formed on the back side thereof which is covered by a removable protective sheet 42. The protective film 42 is supplied and then removed when the magnet carrier ring 36 is affixed to the mounting insulating ring 34 to complete the assembly of the detector ring 33.

The assembly can be done by first affixing the magnet carrier 35 to the insulating ring 34 before assembling it on to the rotor assembly 14. Then, the assembly 33 may be positioned on the face of the rotor 14 and the magnetic action between the magnets 31 of the rotor 14 and the magnets 38 of the detector ring 33 will automatically provide the relative radial location. A indicator mark may then placed on the assembly and these parts (14 and 33) can be affixed together in a suitable manner such as by means of an adhesive between the yoke 29 and the insulating ring 34.

Alternatively, the insulating ring 34 may be affixed to the rotor 14 by an adhesive and then the magnet carrier ring 35 is attached to it. In this case, it is preferable that backing or protective film 42 be formed in radially segmented strips that can be peeled off individually. Thus, with this method, the magnet carrier ring 36 including the adhesive 41 and backing strip 42 is placed over the assembled insulating ring 34 and rotor 14. Again, the magnetic forces will provide the positioning.

Then, one circumferential position of the magnet carrier 35 is mechanically held in place and another circumferentially spaced portion is bent away from the insulating ring 34. At this time a strip of the film 42 is removed. This portion then can be adhesively bonded by pressing the two members together.

Then progressing circumferentially around the assembly, successive strips of the backing film 42 can be removed and the carrier ring 35 adhered to the insulating member 34 when it is already assembled to the rotor 14.

Referring now again to the construction of the machine 11, the magnetic detector ring 33 cooperates with a sensor arrangement that is comprised of three Hall elements 43 that are mounted on an annular mounting element 44. This mounting element 44 is, in turn, fixed to the wiring plate 24 by means of three circumferentially spaced threaded fasteners 45 which pass through elongated slots 46 formed in the mounting plate 44 so as to provide angular adjustment of the positions of the Hall sensors 43.

The Hall elements 43 are of the surface mounting type and are surface mounted to a printed circuit (not shown). This printed circuit that provides an output through conductors 47 to a suitable external control device.

Referring now finally to the terminal conductor plate 24 and its construction, this may be best understood by reference to FIGS. 1 and 8–10. This plate 24 is comprised primarily of an annular insulating substrate 48 which has a construction formed from a base material such as a fiberglass reinforced fabric or paper impregnated with thermal setting resin such as a phenol resin and cured. Basically, the member should be sufficiently rigid and strong for the intended purpose while still providing good electrical insulation.

Although the positions can be reversed, a common annular conductor 49 is affixed to the side of the insulating plate 48 facing toward the rotor 14. Affixed to the other side of the insulting mounting plate 48 are three separate conductors 51, 52 and 53. These conductors 51, 52 and 53 all have adjacent end portions in which conductor receiving openings 54 are formed.

These openings are aligned with openings 55 formed in the insulating plate 48 and are adapted to receive one end of the respective external conductors U, V and W for communicating with the external electrical source. Again, this may be an input such as an electrical input when the machine 11 is operating as a motor, as the preferred embodiment. Alternatively, these may provide an electrical power output to an external electrically powered device when the machine 11 is operating as a generator. These connections are indicated schematically in FIG. 10. The conductors 51, 52 and 53 are also shown schematically in FIG. 10.

It has been previously noted that the windings 23 are formed by electrical conductors such as copper wires insulated by an enamel coating. Either individual wires may be provided for each armature winding 23 or smaller diameter stranded wires (seven for example) may be employed for each winding.

Figure 10:
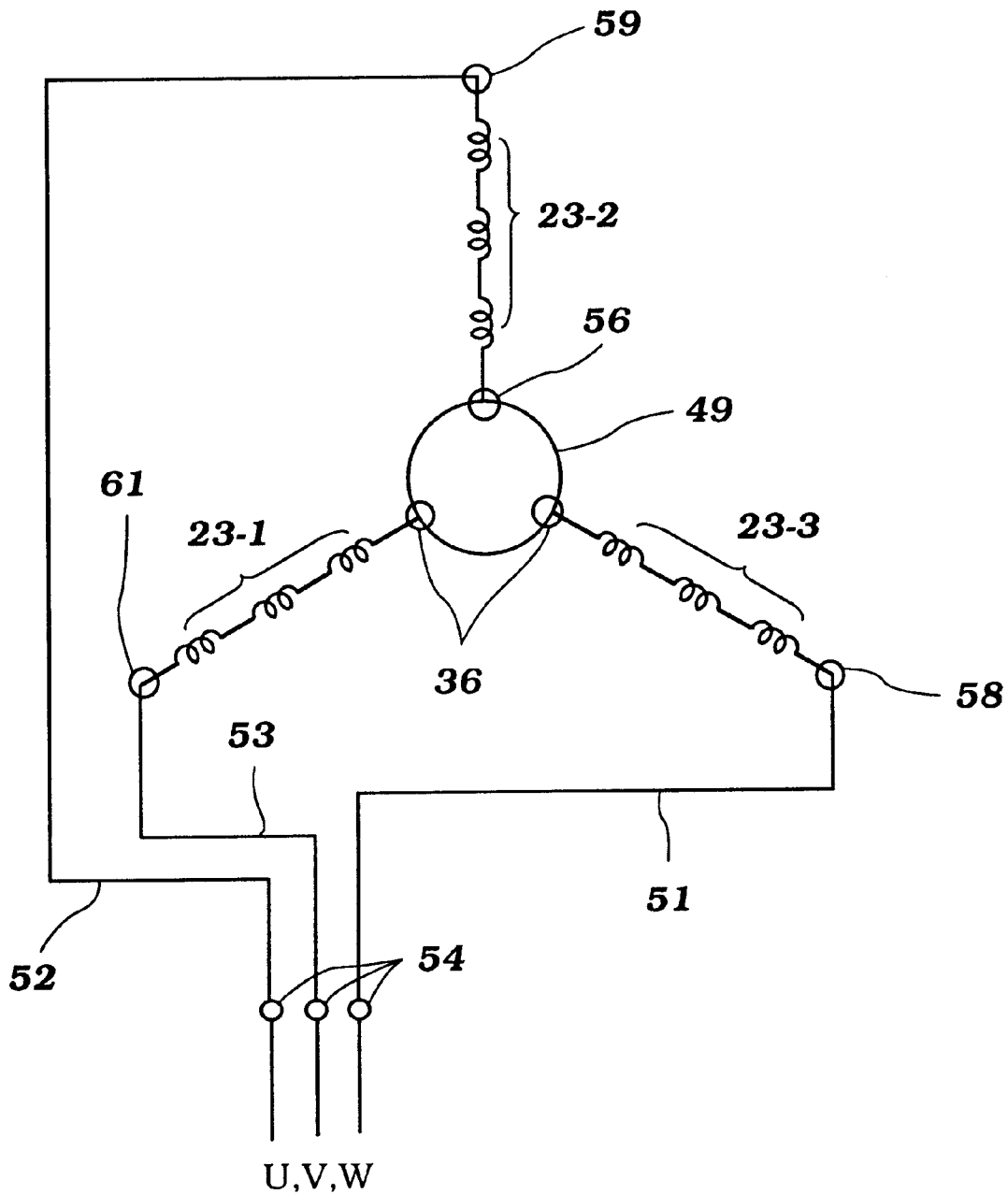
FIG. 10 is a schematic wiring diagram showing the electrical connections for the armature and its terminal plate.

Also, it has been noted that the windings 23 are arranged groups 23-1, 23-2 and 23-3 as shown schematically in FIG. 10. These groups of armature windings 23 have one of their terminals ends connected to the conductor 49 by means of circumferentially spaced slots 56 formed therein. These slots 56 are aligned with like slots formed in the insulating plate 48 which slots appear in FIG. 8 and are identified by the reference numerals 57.

The insulating plate slots 57 are circumferentially and radially larger than the conductor slots 56 so that the ends of the armature windings 23 may be easily slipped into these slots 56 and 57 so as to form the electrical connection with the one terminal ends of the winding to provide the common connection at this point. The terminal ends can be easily bent to be received in the slotted openings and then soldered in place to provide a good electrical connection with minimum wiring and minimum manual or detail work.

In a similar manner, each of the conductors 51, 52 and 53 on the opposite side of the insulating plate 49 is provided with a respective terminal receiving slot 58, 59 and 61. These respective slots 58, 59 and 61 mate with corresponding slots 62, 63 and 64 formed in the insulating plate 48. It should be noted that these slots are, like the insulating plate slots 57 wider than those of the conductors 51, 52 and 53. Also, they are circumferentially spaced from each other so as to provide good electrical insulation and to permit the opposite terminal ends of the windings 23 to be bent into them and attached by soldering. Again, this is accomplished with a minimum of manual labor and a minimum amount of necessary bending of the heavy conductors.

Preferably, the electrical conductivity of the terminals 49, 51, 52 and 53 should be the same as the combined conductivity of the wiring so that the effective cross-sectional area of these terminals 49, 51, 52 and 53 is the same as the area of the winding of the armature coils 23. Again, these terminals are shown schematically in FIG. 10.

In actual practice, all of the terminal ends should be placed in the respective slots before any soldering is done and then all of the soldering is done at the same time. During this, the enamel coating of the wirings 23 will be burnt away so as to provide efficient soldering and good connections.

It should be noted that the outer surfaces of the terminal plate 24 may be coated with a further insulating material so as to provide better insulation.

It has been noted that the sensor ring 44 is affixed to the terminal plate 24 by the threaded fastener 45. For this purpose, nuts, indicated by the reference numeral 65 may be affixed adhesively or in some other manner to the backside of the insulating plate 48 in spaced relationship to the conductors 51, 52 and 53 so as to receive these threaded fasteners 45 without interfering with the electrical circuitry.

Since the sensor or magnet carrier ring 33 is positioned inside of the ends of the coil windings 23, as seen in FIG. 1, and since the sheet like magnets 38 are magnetized in the axial direction, the Hall elements 43 can be positioned quite close to these magnets 38 so as to facilitate the passage of the magnetic flux, as indicated in FIG. 7 by the reference numeral 66 can easily pass to the Hall elements 43.

In addition, the Hall elements 43 are spaced from the electrical terminals for the winding ends providing by the various notches in the terminal plate 24. Thus, this provides a very compact assembly and yet one that is electrically and magnetically isolated.

In the illustrated embodiment, the conductive material of the windings 23 and of the terminal plates 49, 51, 52 and 53 on the terminal ring 24 are formed from copper, other materials may be employed such as aluminum. Alternatively, wire conductors rather than plates may be employed for the terminals 49, 51, 52 and 53. Nevertheless, the structure is quite compact and electrically and magnetically protected so as to provide not only a compact construction but one which can be easily and inexpensively manufactured.

Of course, the foregoing description is that of a preferred embodiment of the invention and various changes and modifications may be made without departing from the spirit and scope of the invention, as defined by the appended claims.

What is claimed is:

1. A rotating electrical machine having an outer housing in which a stator is affixed, a rotor journaled within said outer housing and cooperating with said stator, said stator being formed by a plurality of armatures having poles and surrounding armatures windings each having a respective pair of terminal ends, a terminal plate affixed within said outer housing on at least one side of said armature assembly, said terminal plate comprising an insulating plate having conductive terminals affixed to opposite sides thereof, one of said conductive terminals being formed with a notch in an oilier peripheral edge thereof that is aligned with a corresponding notch formed in an outer peripheral edge of said insulating plate for receiving one of said respective terminal ends of said armature windings for facilitating a soldered connection therebetween, the other of said conductive terminals having a plurality of notches formed in an outer peripheral edge and which is aligned with a corresponding notch formed in an outer peripheral edge of said insulating plate, each of said plurality of notches of the other of said conductive terminals providing a common electrical connection to the other of the terminal ends of said armature windings, and each of said conductive terminals providing a respective electrical connection to which main power connection cables are electrically connected.

2. A rotating electrical machine as set forth in claim 1, wherein the machine operates with three phase alternating current and the armature windings are arranged in groups of three, each of said groups being electrically connected to a respective one of the separate conductive terminals.

3. A rotating electrical machine as set forth in claim 1, wherein the rotor is formed with a plurality of circumferentially spaced permanent magnets thereon and further including a magnetic detector ring affixed for rotation with said rotor at one side thereof and cooperating with sensor elements fixed relative to the outer housing.

4. A rotating electrical machine as set forth in claim 3, wherein the magnetic detector ring comprises a non magnetic carrier having a plurality of circumferentially spaced magnets imbedded therein.

5. A rotating electrical machine as set forth in claim 4, wherein the circumferentially spaced magnets of the magnetic detector ring are magnetically aligned with the permanent magnets of the rotor.

6. A rotating electrical machine as set forth in claim 5, wherein the poles of the magnets of the magnetic detector ring are spaced in the direction of the rotor axis and the poles of the permanent magnets of the rotor are radially spaced.

7. A rotating electrical machine as set forth in claim 3, wherein the terminal plate is an annular plate and extends circumferentially around and radially outwardly of the magnet detector ring.

8. A rotating electrical machine as set forth in claim 7, wherein the terminal plate and the magnet detector rins are substantially axially aligned with each other.

9. A rotating electrical machine as set forth in claim 8, wherein circumferentially spaced poles of the magnetic detector ring are magnetically aligned with the permanent magnets of the rotor.

10. A rotating electrical machine as set forth in claim 9, wherein the poles of the magnets of the magnetic detector ring are spaced in the direction of the rotor axis and the poles of the permanent magnets of the rotor are radially spaced.

11. A rotating electrical machine as set forth in claim 10, wherein the machine operates with three phase alternating current and the armature windings are arranged in groups of three, each of said groups being electrically connected to a respective one of the separate conductive terminals.

* * * * *

UNITED STATES PATENT AND TRADEMARK OFFICE
CERTIFICATE OF CORRECTION

PATENT NO : 6153957
DATED : November 28, 2000
INVENTOR(S) : Tadashi Takano

It is certified that error appears in the above-identified patent and that said Letters Patent is hereby corrected as shown below:

Column 6, line 62, Claim 1, delete "oilier" and insert -- outer--.

Column 8, line 10, Claim 8, delete "rins" and insert --rings--.

Signed and Sealed this

Twenty-second Day of May, 2001

Attest:

NICHOLAS P. GODICI

Attesting Officer

Acting Director of the United States Patent and Trademark Office